June 9, 1959
J. W. DUDLEY ET AL
2,890,437
SONAR APPARATUS
Filed July 18, 1955
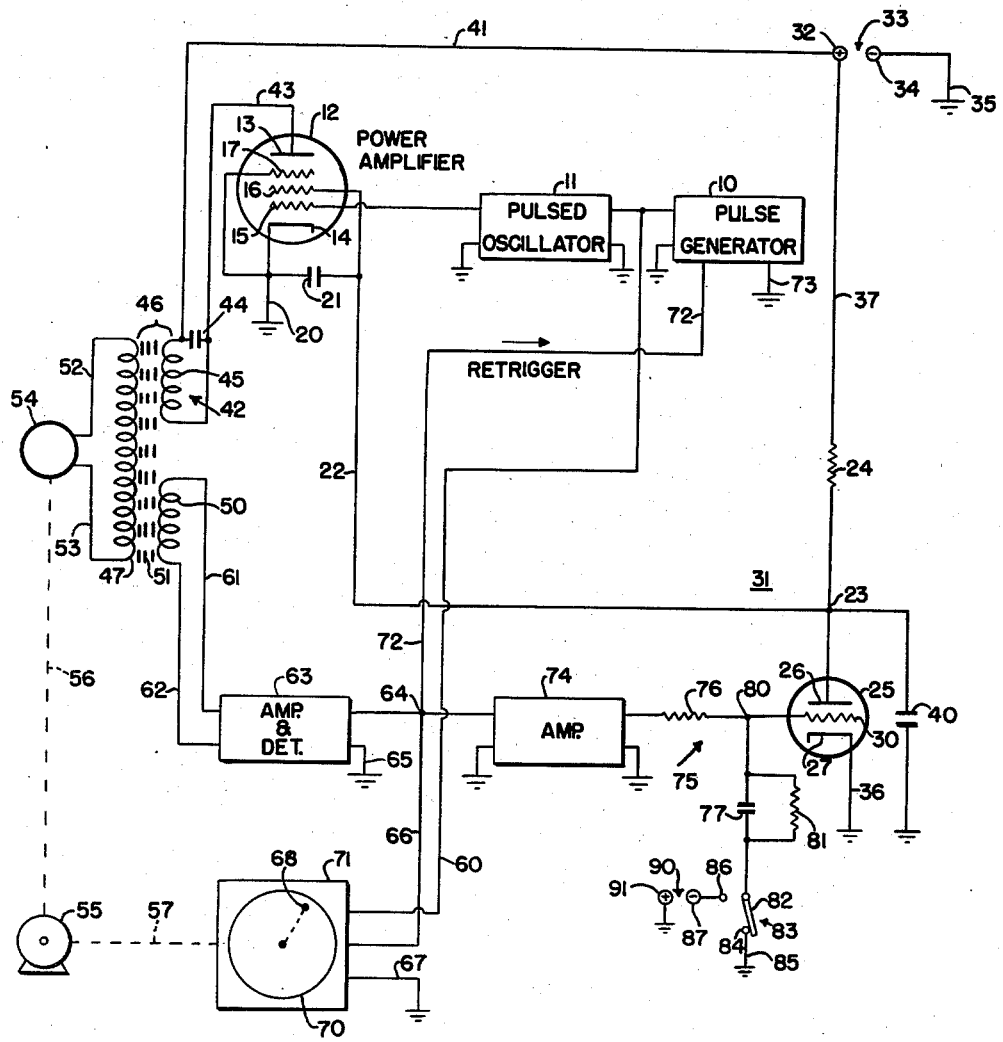
INVENTOR.
JOHN W. DUDLEY
ROY H. MALM
BY
*George W. Field*
ATTORNEY

United States Patent Office 2,890,437
Patented June 9, 1959

2,890,437

SONAR APPARATUS

John W. Dudley and Roy H. Malm, Seattle, Wash., assignors to Minneapolis-Honeywell Regulator Company, Minneapolis, Minn., a corporation of Delaware Application July 18, 1955, Serial No. 522,708

4 Claims. (Cl. 340—3)

This invention relates to the field of search sonar equipment and more particularly to improvements in the electronic circuitry for such equipment. A primary object of the invention is to improve the ratio of signal to clutter, so as to enhance the intelligibility of the display, without unduly reducing the signal intensity. More specifically, it is an object of the invention to vary the power content of pulses transmitted into the medium, in accordance with a function of the amplitude of pulses received after reflection, while simultaneously retriggering the transmitter upon the reception of each reflected pulse. Another object of the invention is to control the power of a multi-grid electron discharge tube by controlling the voltage on one of the grids as a function of a signal quantity, preferably as the time integral of that quantity.

Various other objects, advantages and features of novelty not particularly enumerated above which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention.

The single figure of the drawing is a schematic showing of search sonar equipment embodying the invention. A pulse generator 10 normally keys an oscillator 11 to give pulses of oscillation at a selected frequency. The interpulse period is equal to the round trip travel time for sound, in water as a medium, through a selected maximum range of operation of the equipment, and the pulse length is selected as a very small portion of the inter-pulse period. The oscillator frequency is selected in consideration of the absorption and scattering effect of the fluid and the degree of directionality required from a transducer of practical dimensions. In one satisfactory installation one millisecond pulses of 175 kilocycle oscillations were transmitted at ⅔ second intervals to give a maximum range in sea water of 1600 feet.

The output of oscillator 11 is supplied to a power amplifier pentode 12 having an anode 13, a cathode 14, a control grid 15, a screen grid 16, and a suppressor grid 17 connected to cathode 14 and grounded at 20. Screen grid 16 is bypassed to ground by a capacitor 21, and is connected by a conductor 22 to the junction point 23 between a fixed resistor 24 and a triode 25 having an anode 26, a cathode 27, and a control grid 30. Resistor 24 and triode 25 in series comprise a voltage divider 31 connected between ground and the positive terminal 32 of a direct voltage source 33 whose negative terminal 34 is grounded at 35: to this end cathode 27 is grounded at 36 and resistor 24 is connected to terminal 32 by conductor 37. A filter capacitor 40 is connected between junction point 23 and ground.

The anode circuit for pentode 12 may be traced from positive terminal 32 through conductor 41, tuned circuit 42, conductor 43, anode 13, cathode 14, and ground connections 20 and 35 to negative terminal 34. Tuned circuit 42 includes a capacitor 44 connected in parallel with one winding 45 of a transformer 46 which has further windings 47 and 50, and which may include a powdered iron core 51.

Winding 47 is connected by conductors 52 and 53 to a transducer 54 for converting electrical oscillations to compressional waves in fluid, suitably mounted for rotation about a vertical axis to "scan" an annular volume of the fluid medium. The details of the transducer and its mounting are not pertinent to the invention here, and hence are not disclosed specifically: one suitable arrangement is the subject matter of a patent application in the name of Richard J. Allyn, Serial No. 419,484, filed March 29, 1954, now Patent No. 2,829,360 and assigned to the assignee of the present application.

The transducer converts the electrical oscillations supplied on conductors 52 and 53 to compressional waves in the fluid medium projected directionally in a quite sharply defined beam. Each pulse from generator 10 results in a train of compressional waves which travels outwardly from the transducer until it impinges on a reflecting object from which it is reflected to the transducer. Arrival of the reflected pulse at the transducer takes place during the inter-pulse period, and the transducer converts the compressional wave energy to electrical energy which is fed back to winding 47 of transformer 46 by conductors 52 and 53. The interval between the transmission of the waves and the reception of the reflections thereof is a measure of the distance from the transducer to the reflecting object, and the azimuth of the object from the location of the transducer is determined by the direction in which the compressed waves are instantaneously being propagated.

Winding 50 is connected by conductors 61 and 62 to an amplifying and detecting unit 63 which supplies pulses of electrical energy between a junction point 64 and a ground connection 65. These pulses are transmitted along a conductor 66 and ground connections 67 and 65 to unblank a substantially blanked cathode ray tube 70 in display 71. It is conventional in sonar scan equipment of this sort to provide an interconnection 60 between the cathode ray tube and a unit such as pulse generator 10 suitable to cause the electron beam to move from the center of the tube face beginning with transmission of a pulse, at a rate proportional to the round trip speed of sound in the fluid medium, and to unblank the tube when the reflected pulse is received, so that a "pip" 68 appears on the tube face at a radial displacement from the center representative of the distance of a reflecting object from the transducer.

It is also conventional in equipment of this nature to provide means such as is suggested by motor 55 and shaft 56 for rotating the transducer in azimuth, and for interconnecting the display with the rotating means as suggested at 57, so that the radius along which the substantially suppressed electron beam sweeps is angularly related to the direction in which the compressional wave energy is propagated. Details of these arrangements are not pertinent to the invention here, and hence are not disclosed specifically: one suitable arrangement is that in a patent application in the name of Roy H. Malm, Serial No. 398,110, filed December 14, 1953, and assigned to the assignee of the present application.

In addition to display 71, an audio amplifier and loudspeaker may be connected to junction point 64 if desired.

Junction point 64 is further connected by a conductor 72 to pulse generator 10, the connection being completed by ground connections 73 and 65. Whenever a pulse from junction point 64 is impressed on pulse generator 10 the pulse generator is immediately triggered to initiate a new pulse, thus curtailing the normal inter-pulse period by an amount depending upon the distance of the reflecting object. Thus more pulses per second are automatically provided when the object distance is small enough to permit, and the display is accordingly better defined. Further details of a retriggering scan sonar will be found in the copending application of John W. Dudley, Serial No. 587,598 filed May 28, 1956, and assigned to the assignee of the present application.

The pulses on junction point 64 are also fed through an isolating amplifier 74 whose output is supplied to a resistance-capacitance network 75 including a resistor 76 and a capacitor 77 having a junction point 80, and a further resistor 81 bridged across capacitor 77. Junction point 80 is connected to grid 30 of triode 25. The end of resistor 76 remote from amplifier 74 is connected to the movable contact 82 of a switch 83 having a first fixed contact 84 grounded at 85 and a second fixed contact 86 connected to the negative terminal 87 of a voltage source 90 whose positive terminal 91 is grounded.

Network 75 functions as an integrator of the output from amplifier 74, resistor 81 acting to establish a dependable discharge path for capacitor 77. Two alternative modes of operation of the system are possible, depending on the characteristics chosen for network 75: each has desirable properties, and the invention here embraces both. In the first mode of operation the time constant of the network is of the same order as the transmitted pulse width, and just long enough to maintain the grid of triode 25 at a fairly constant level determined by the output of amplifier 74 during the transmitted pulse triggered by the received pulse. In the second mode of operation the time constant of the network is long compared to the inter-pulse period, so that the voltage on the grid of triode 25 varies slowly in accordance with the average strength of the received pulse.

The voltage at junction point 23 is determined by the ratio between the impedance of triode 25 and that of resistor 24. When there is no signal on grid 30 from amplifier 74 the impedance of triode 25 is maximum. Junction point 23, and therefore screen grid 16 of pentode 12, are at a maximum voltage: the power output of the pentode is maximum at this time. As the signal on grid 30 increases, the impedance of the triode, and therefore the screen grid voltage on pentode 12, decreases. The reduction of this screen voltage reduces the power output of the pentode in the same manner.

The purpose of the structure recited will now be apparent. In search sonar apparatus it is necessary to supply enough power to the transducer to ensure reliable echo signals from objects of selected minimum scattering cross section at a selected maximum range, for a receiver sensitivity setting low enough to cut off a large proportion of the "clutter" resulting from local reverberation, surface reflections, etc. As the object distance decreases less power is required, for a given receiver sensitivity, to give an indication of the same reliability, because energy absorption in the fluid medium is reduced and a larger spherical angle is enclosed at the transmitter by the reflecting target outline. Clutter as well as signal is proportional to the transmitter power: thus by reducing power as the range is reduced, the signal reliability is not reduced and the clutter is considerably decreased. This is particularly true where the pulse repetition frequency is also increased at the same time: the increased energy propagation per unit time results in a higher mean output from network 75 and hence a lower output power, so that variation of power and variation of pulse repetition frequency are not independent but rather are related.

*Operation*

In considering the operation of the equipment, suppose that the transducer is directed into a fluid volume containing no reflecting objects within the range of the equipment. Then a succession of pulses are sent out by the transducer, and faint radial lines of full length appear on tube 70 at an angle determined by the direction of the transducer. If the latter is scanned, the faint line rotates about the center of the tube. If a reflected pulse is received, due to the transducer being directed toward a reflecting object, a pip appears on the tube and an audible sound is heard if there is a loudspeaker. The radial displacement of the pip, and the spacing of the audible sound, are measures of the distance of the reflecting object from the transducer. If the object is close to the transducer not only is the pulse repetition rate changed markedly, but the transmitted power is reduced, thus reducing clutter.

It may be desired not to change the power of the transmitter unless a received pulse is of a preselected amplitude or greater. If such is the case, switch blade 82 is thrown to engage fixed contact 86, and the voltage of source 90 is impressed on the grid of triode 25 as a bias. Thereafter only pulses of magnitude greater than source 90 can reduce the impedance of the triode.

Numerous objects and advantages of our invention have been set forth in the foregoing description, together with details of the structure and function of the invention, and the novel features thereof are pointed out in the appended claims. The disclosure, however, is illustrative only, and we may make changes in detail, especially in matters of shape, size, and arrangement of parts, within the principle of the invention, to the full extent indicated by the broad general meaning of the terms in which the appended claims are expressed.

We claim as our invention:

1. A sonar search system including a pulse transmitter, a receiver, and a display, said transmitter including an electron discharge device having input and output electrodes and a further electrode, said receiver giving a signal in accordance with reflections of the pulses from said transmitter; a source of voltage for said further electrode in said transmitter including a fixed impedance and a triode connected in series, and means connecting said further electrode to the point of connection therebetween; means normally maintaining the impedance of said triode at a selected high value, and means connected to said triode and said receiver for decreasing the impedance of said triode in accordance with said signal, so that when the transmitted pulses are reflected from nearby surfaces the power content of the transmitted pulses is reduced.

2. A sonar search system including a pulse transmitter, a receiver, and a display, said transmitter including an electron discharge device having input and output electrodes and a further electrode, said receiver giving a signal in accordance with reflections of the pulses from said transmitter; a source of voltage for said further electrode in said transmitter including a fixed impedance and a triode connected in series, and means connecting said further electrode to the point of connection therebetween; means normally maintaining the impedance of said triode at a selected high value, and means including an integrator connected to said triode and said receiver for decreasing the impedance of said triode in accordance with the integral of said signal, so that when the transmitted pulses are reflected from nearby surfaces the power content of the transmitted pulses is reduced.

3. A sonar search system including a pulse transmitter, a receiver, and a display, said transmitter including an electron discharge device having input and output electrode and a further electrode, said receiver giving a signal in accordance with reflections of the pulses from said transmitter; a source of voltage for said further electrode and said transmitter including a fixed impedance and a variable impedance connected in series, and means connecting said further electrode to the point of connection therebetween; means normally maintaining the impedance of said variable impedance means at a selected high value, and means connected to said variable impedance means and said receiver for decreasing the impedance of said variable impedance means in accordance with said signal, so that when the transmitted pulses are reflected from nearby surfaces the power content of the transmitted pulses is reduced.

4. A sonar search system including a pulse transmitter, a receiver, and a display, said transmitter including an electron discharge device having input and output electrodes and a further electrode, said receiver giving a signal in accordance with reflections of the pulses of said transmitter; a variable source of voltage for said further electrode and said transmitter; means connecting said variable source of voltage to said further electrode; means normally maintaining the output of said variable source of voltage at a predetermined high value; and means responsive to the output of said receiver for decreasing the output of said source of voltage inversely in accordance with said signal so that when the transmitted pulses are reflected from nearby surfaces the power content of the transmitted pulses is reduced.

References Cited in the file of this patent

UNITED STATES PATENTS

| | | |
|---|---|---|
| 2,428,799 | Hayes et al. | Oct. 14, 1947 |
| 2,530,418 | Alvarez | Nov. 21, 1950 |
| 2,578,268 | Sherwin | Dec. 11, 1951 |
| 2,739,237 | Stone | Mar. 20, 1956 |

FOREIGN PATENTS

| | | |
|---|---|---|
| 787,383 | France | July 1, 1935 |